United States Patent [19]

Blue

[11] Patent Number: 5,823,637

[45] Date of Patent: Oct. 20, 1998

[54] UNIVERSAL VACUUM PUMP APPARATUS AND METHOD

[76] Inventor: W. Scott Blue, 19355 Sundale Dr., South Bend, Ind. 46614

[21] Appl. No.: 818,531

[22] Filed: Mar. 14, 1997

[51] Int. Cl.$^6$ ................................................. B60T 13/46
[52] U.S. Cl. .............................. 303/7; 60/412; 303/12; 417/53; 188/356
[58] Field of Search .................................... 303/7, 15, 20, 303/DIG. 3, DIG. 4, 11, 12; 188/3 R, 3 H, 112 R, 112 A, 356, 151 A; 417/44.3, 44.1, 63, 53–55, 12, 44.2, 223; 307/118; 340/626, 309.15, 451; 318/481; 416/19, 99; 60/327, 611, 397, 407, 409, 412

[56] References Cited

U.S. PATENT DOCUMENTS

| | | | |
|---|---|---|---|
| 2,142,514 | 1/1939 | Jones | 303/12 |
| 2,705,870 | 4/1955 | Holton | 188/356 |
| 2,732,685 | 1/1956 | Oishei | 303/12 |
| 4,072,362 | 2/1978 | Van Anrooy | 303/7 |
| 4,309,149 | 1/1982 | McCombs, Jr. | 303/12 |
| 4,398,771 | 8/1983 | McCurry et al. | 303/15 |
| 4,568,129 | 2/1986 | Stumpe | 303/7 |
| 4,596,514 | 6/1986 | Matsumoto et al. | 303/12 |
| 4,629,256 | 12/1986 | Fannin | 303/8 |
| 4,671,578 | 6/1987 | Rothen et al. | 303/15 |
| 4,697,853 | 10/1987 | Scholz | 303/7 |
| 4,738,112 | 4/1988 | Nomura et al. | 303/12 |
| 4,749,238 | 6/1988 | Singleton et al. | 303/15 |
| 4,763,959 | 8/1988 | Vandemotter | 303/9 |
| 5,295,736 | 3/1994 | Brearley | 303/7 |
| 5,335,974 | 8/1994 | Klink | 303/7 |
| 5,342,117 | 8/1994 | Price et al. | 303/3 |
| 5,411,321 | 5/1995 | Harness | 303/7 |
| 5,431,253 | 7/1995 | Hargrove | 188/3 |
| 5,624,239 | 4/1997 | Osika | 303/12 |

FOREIGN PATENT DOCUMENTS

| | | | |
|---|---|---|---|
| 1119467 | 5/1989 | Japan | 303/12 |

*Primary Examiner*—Douglas C. Butler
*Attorney, Agent, or Firm*—Law Office of Jon M. Jurgovan

[57] ABSTRACT

The invented apparatus is designed for use with a tow vehicle and trailer combination. The apparatus includes a controller, and can also include a vacuum sensor and a vacuum pump. The vacuum sensor is communicatively coupled to sense the vacuum supply available to operate a trailer brake system that is interfaced to the tow vehicle's brake system to coordinate braking of the trailer and vehicle. The vacuum sensor generates a vacuum pressure level signal supplied to the controller. The controller periodically determines whether the vacuum pressure level is less than a first predetermined vacuum pressure level. If so, the controller activates the vacuum pump by generating a vacuum pump switch signal. On the other hand, if the vacuum pressure level is greater than the first predetermined level, the controller does not activate the vacuum pump switch signal. If the vacuum pump switch signal is activated, the controller periodically determines whether the vacuum pressure level has risen to or above a second predetermined pressure level that is greater than the first level, and that corresponds to a maximum vacuum supply level. If so, the controller deactivates the vacuum pump. On the other hand, if the vacuum pressure level has not risen above the second level, the controller does not deactivate the vacuum pump. The invented apparatus also can include a control valve used to interface and coordinate the tow vehicle and trailer brake systems, as well as a display that visually indicates the vacuum pressure level to the driver, and an alarm that warns the driver of a low-vacuum condition. The invention also includes a related method.

29 Claims, 6 Drawing Sheets

UNIVERSAL VACUUM PUMP APPARATUS AND METHOD

BACKGROUND OF THE INVENTION

1. Field of the Invention

This invention is directed to an apparatus and method for generating a vacuum source that is sufficient to operate vacuum-controlled brakes of a trailer towed by a vehicle.

2. Description of the Related Art

Many road accidents involving vehicles and their towed trailers have occurred because the trailers were not equipped with independent brake systems. Such accidents can occur due to insufficient braking capability in the tow vehicle to stop the combined vehicle and trailer in time to prevent an accident. These accidents can also occur because, when the tow vehicle's brakes are applied, the tow vehicle is slowing while the trailer's momentum causes the trailer to continue moving into the slowing tow vehicle, a circumstance that can cause the trailer to pivot about its coupling to the vehicle, thus resulting in a so-called 'jackknife' condition. Jackknifing has been the cause of many serious, often fatal, road accidents.

To safely tow a trailer with a vehicle, an independent brake system is often required for the trailer. Of course, for effective operation, the trailer brake system must be coupled to the tow vehicle brake system in a manner that coordinates the braking action of the two systems when the driver applies the tow vehicle's brake pedal. Among the various types of trailer brake systems commonly used for trailers are vacuum-over-hydraulic brake systems. These vacuum-over-hydraulic brake systems require the generation of a vacuum control signal proportionate to the driver's application of the tow vehicle brakes. In addition to the vacuum control signal, these trailer brake systems require a source of service vacuum to provide the vacuum power needed to operate the trailer's brake system.

In previous years' models, most vehicles generated a sufficient vacuum source at their air intake manifolds to operate not only the tow vehicle's brake system, but also the trailer's brake system assuming the trailer's size and load to be appropriate for the tow vehicle. However, more modem vehicles tend to generate insufficient vacuum to operate an independent trailer brake system. For example, electronic fuel injection vehicles generate relatively little vacuum, and cannot alone effectively operate a vacuum-controlled trailer brake system. In diesel engines, no vacuum supply whatsoever is generated, so the vacuum supply for the trailer must be generated independently for use with a tow vehicle that has a diesel engine.

In an attempt to overcome this problem, belt-driven vacuum pumps have been installed in tow vehicles to generate the vacuum necessary to operate the trailer's brake system. However, belt-driven vacuum pumps require mountings and belts to engage the pump with the tow vehicle's engine. The pumps, mountings and belts are virtually unique to the particular type of vehicle in which they are installed. Therefore, because the vacuum pump, its mountings and belts must be uniquely designed and separately manufactured for each type of vehicle, the belt-driven vacuum pump and its associated mountings and belts are relatively expensive. In addition, a person desiring to install a belt-driven vacuum pump must become familiar with the specific type and manner of installation of the pump, mountings, belts and arrangement for the type of vehicle in which the person desires to install the belt-driven pump. Thus, the person installing the belt-driven vacuum pump must spend considerable time in determining how to install the pump as well as in the actual installation of the pump in the tow vehicle. Unfortunately, these problems with belt-driven vacuum pumps are likely to at least discourage, and possibly prohibit, vehicle owners from installing the vacuum pumps necessary to provide an adequate vacuum source for the trailer. Additionally, because of the uniqueness of each pump system as applied to a specific vehicle, the pump cannot be moved from the original truck to a new vehicle of different make and/or model. It would be desirable to overcome the above-noted disadvantages of belt-driven vacuum pumps.

Furthermore, in the event of a low-vacuum condition due to repeated use of the brake systems or a brake system failure, for example, with previous vacuum-pump systems, the driver has no way of knowing that the vacuum is insufficient to operate the trailer's brake system. It would be desirable to provide a means by which the driver could be alerted to the existence of a low-vacuum condition.

SUMMARY OF THE INVENTION

This invention overcomes the above-noted disadvantages. In a first embodiment, an apparatus in accordance with this invention includes a controller, and can also include a vacuum sensor, a vacuum pump, and a control valve. The control valve is coupled to receive a brake fluid control signal generated by the driver's operation of the tow vehicle brake system using a brake pedal, for example. The control valve converts the brake fluid signal into a vacuum control signal, and is coupled to supply the vacuum control signal to the trailer brake system. The vacuum control signal controls the trailer brake system in proportion to the degree to which, the driver applies the tow vehicle brakes. The control valve also couples the vacuum supply to the trailer brake system to provide a vacuum service supply for the trailer brake system.

The vacuum sensor is preferably coupled to the control valve to sense the supply vacuum generated by the vacuum pump. The vacuum sensor detects the vacuum pressure level of the supply vacuum, and generates a signal that indicates the level or amount of vacuum pressure available for generation of the vacuum supply. The controller is coupled to the vacuum sensor, and generates a vacuum pump switch signal based on the vacuum level signal, to ensure that the vacuum supply is adequate to operate the trailer brake system. The vacuum pump generates vacuum for the supply, based on the switch signal generated by the controller. In preferred configuration, the apparatus includes a relay coupled between the controller and the vacuum pump, that selectively activates or deactivates the vacuum pump, based on the controller's switch signal.

The controller is programmed with various predetermined pressure levels that are used to ensure that sufficient vacuum exists for the vacuum supply. The conventions for the vacuum pressure measurement units adopted for use in this document are as follows. By definition, vacuum is negative air pressure or air pressure that is less than atmospheric air pressure. The most common unit to describe vacuum pressure is 'inches of Mercury' ("Hg) in the United States or milliBar in International Units. If atmospheric air pressure is defined to be zero inches of mercury (0"Hg), then the vacuum pressure level can be defined as being at negative X inches of Mercury (–X"Hg), where X is a measure of the amount by which the vacuum pressure level is below atmospheric air pressure. For example, minus twenty inches of Mercury (–20"Hg) is twenty units below atmospheric air pressure. In addition, if a given vacuum pressure level is greater than another vacuum pressure level, this means that the given vacuum pressure level is further below atmospheric pressure than that other vacuum pressure level. Conversely, if a given vacuum pressure level is less than another vacuum pressure level, then the given vacuum pressure level is closer to atmospheric pressure than that other vacuum pressure level.

With respect to the invented apparatus, there are three predetermined vacuum pressure levels of interest. The first predetermined vacuum pressure level is the vacuum pressure level that, when reached due primarily to use of the vacuum brake system, the controller will activate the pump to generate vacuum for the vacuum supply. The second predetermined vacuum pressure level is greater than the maximum amount of vacuum required to be generated by the apparatus. Once this level is reached due to operation of the vacuum pump, the controller will deactivate the vacuum pump. The third predetermined vacuum pressure level, or alarm level, corresponds to a vacuum pressure level that is less than the first predetermined level, and is used to determine whether or not a low vacuum warning signal is generated by the vacuum pump controller.

Preferably, the controller generates the switch signal so as to activate the vacuum pump to increase the vacuum supply (or, in other words, to lower the vacuum supply pressure) if the controller determines that the vacuum pressure level signal generated by the vacuum sensor is less than or equal to the first predetermined vacuum pressure level or, in other words, is less than or equal to the maximum desired vacuum. Conversely, the controller generates the switch signal so as to deactivate the vacuum pump once the controller determines that the vacuum pressure level signal is at or above the second predetermined vacuum pressure level or, in other words, the system is at maximum vacuum. During normal operation, the controller continues to read and compare the vacuum pressure with the first and second predetermined vacuum pressure levels, and generates the switch signal as necessary to maintain a supply of vacuum sufficient to operate the trailer's brakes. Thus, during operation of the invented apparatus, the vacuum supply varies between a minimum acceptable vacuum pressure level (i.e., the first predetermined vacuum pressure level) or a maximum acceptable pressure level (i.e., the second predetermined vacuum pressure level). The first and second predetermined vacuum pressure levels are programmed into the controller, and accordingly, can be varied so that the apparatus can be readily adapted to accommodate different trailer brake systems, configurations and trailer loads. Preferably the controller is implemented as a microcontroller that is relatively inexpensive and readily adapted to function effectively with the tow vehicle/trailer combination. The implementation of the controller as a solid state device provides a controller that is durable, accurate and long-lasting, and that can be programmed versatilely to accommodate different tow vehicles and/or trailers.

The apparatus can also include a display such as a light-emitting diode (LED) or liquid crystal display (LCD), that is coupled to the controller. The controller generates a display signal that is indicative of the supply vacuum pressure level, based on the vacuum sensor's signal. Preferably, the display is positioned in the tow vehicle in a location visible to the driver, for example, on the vehicle's dashboard, so that the driver can readily determine the amount of vacuum available for braking the trailer.

The apparatus can also include a signal conditioner coupled between the vacuum sensor and the controller, that is adjustable to set a zero vacuum level corresponding to a condition in which the vacuum pressure level is at atmospheric pressure, or in other words, a situation in which the vacuum supply is totally depleted. The signal conditioner can also be adjusted to set a span range level between the zero vacuum level and a maximum vacuum level corresponding to the highest vacuum pressure that can be indicated by the display signal generated by the controller. The controller generates the display signal based on the zero level and the span range level, a feature that allows the display to accommodate different operational ranges.

To indicate the presence of a potentially dangerous low-vacuum condition, the apparatus can include an alarm that is coupled to the controller. The controller generates an alarm signal that is supplied to activate the alarm if the controller determines that the vacuum pressure level is below a third predetermined vacuum pressure level at which there is a significant risk or certainty that the vacuum supply would be insufficient to operate the trailer brake system. Preferably, the alarm is a visual or audio signal located or positioned in the tow vehicle to indicate the low-vacuum condition to the driver.

A second embodiment of the apparatus is similar to the first embodiment, but does not include the control valve.

The invented method includes steps of sensing a pressure level of a vacuum source, comparing the sensed vacuum pressure level with a first predetermined level, and activating a vacuum pump if the sensed pressure level is less than or equal to the first predetermined level. The method further includes a step of comparing the sensed pressure level with the second predetermined level that is greater than the first predetermined level, and deactivating the vacuum pump if the sensed pressure level is greater than or equal to the second predetermined level. The method also includes steps of sensing a brake fluid signal used to operate a brake system of a vehicle towing the trailer, and generating a vacuum control signal with the vacuum source to operate a trailer brake system, based on the sensed brake fluid signal. Thus, the invented method helps significantly to ensure the generation of sufficient vacuum to allow operation of a trailer brake system. The invented method can also include a step of generating a display based on the sensed vacuum pressure level. In addition, the method can include steps of determining whether the sensed vacuum pressure level is above a third predetermined level, and generating an alarm based on the determination. Thus, the invented method can indicate the existence of a potentially dangerous low-vacuum condition in which the trailer brakes would not operate if applied.

These together with other features and advantages, which will become subsequently apparent, reside in the details of construction and operation as more fully hereinafter described and claimed, reference being made to the accompanying drawings, forming a part hereof, wherein like numerals refer to like parts throughout the several views.

DESCRIPTION OF THE PREFERRED EMBODIMENTS

Figure 1:
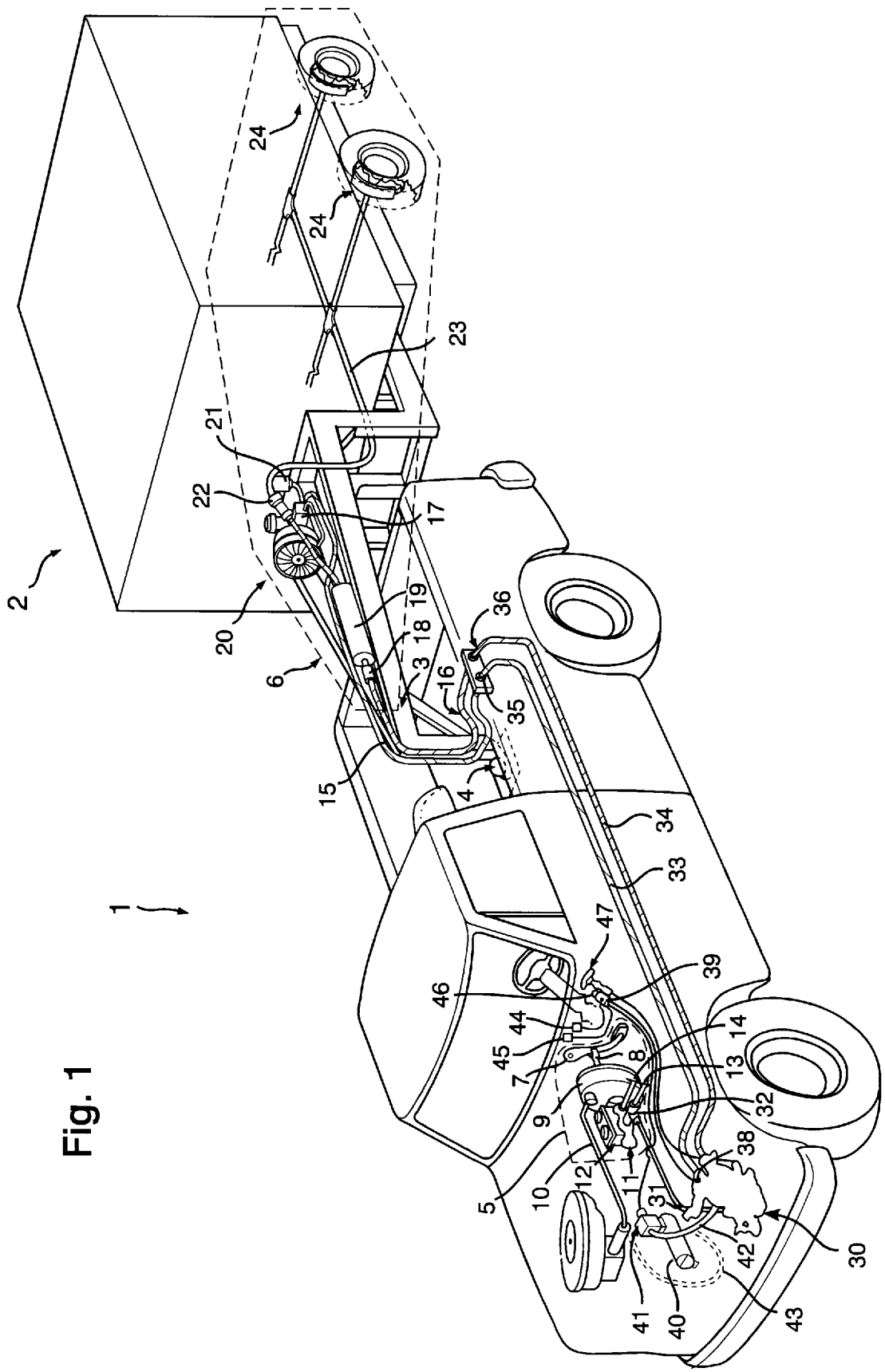
FIG. 1 is a perspective view of relevant portions of tow vehicle and trailer brake systems, and the invented apparatus.

In FIG. 1, a tow vehicle 1 is coupled to a trailer 2. More specifically, the trailer is coupled to the tow vehicle with a hitch 3 that is connected to a coupler 4 located in the tow vehicle's bed. The coupler securely holds the hitch to the tow vehicle, yet allows the hitch to swivel about the coupler when the tow vehicle turns.

The tow vehicle and trailer include brake systems 5, 6, respectively, indicated with broken lines in FIG. 1. The vehicle's brake system can be one of a number of conventional brake systems whose configurations are well-known and understood by persons of ordinary skill in this technology. A limited description of the tow vehicle's brake system is provided below.

1. The Tow Vehicle Brake System

In FIG. 1, the vehicle's brake system includes a brake pedal 7, a rod 8, diaphragm (not shown), a vacuum booster 9, a vacuum line 10, a piston 11, a master cylinder 12, and front and rear brake fluid lines 13, 14. The brake pedal is mounted to swing about a pivot that is fixed to the vehicle. The brake pedal is connected to the rod that extends into the booster. The booster has a diaphragm to which the rod is attached and through which the rod extends into the master cylinder. The first compartment of the booster (that facing the rear of the vehicle) defines an opening that communicates with atmosphere. The second compartment on the opposite side of the diaphragm relative to the first compartment, is air-tight, and is connected to the vacuum line that is coupled in communication with the tow vehicle's engine air intake manifold. The vacuum line supplies vacuum generated by the tow vehicle's engine, to the second compartment. The pressure differential across and the size of the diaphragm create a bias that assists the driver when applying the brakes. The rod extends through the diaphragm and is connected to the piston that is movable in the master cylinder. If the driver depresses the brake pedal, the rod forces the piston head to move in the master cylinder, which displaces brake fluid from the cylinder's reservoir into the brake lines 13, 14 that supply brake fluid to activate the front and rear brakes, respectively, of the tow vehicle. If the driver releases the brake pedal, the back pressure of the brake fluid releases the front and rear brakes, and also causes the piston to move the rod in a manner that causes the brake pedal to swing about its pivot toward the driver.

2. The Trailer Brake System

The trailer brake system 6 includes vacuum control and service lines 15, 16, relay valve 17, check valve 18, vacuum tank 19, booster 20, a diaphragm and piston (not shown), air filter 21, cylinder 22, brake line 23, and trailer brakes 24. The vacuum control line 15 is coupled in communication with the relay valve. The vacuum control signal carried on the line 15 controls the state of the relay valve that in turn controls whether and the degree to which the trailer brake system is activated. The vacuum service line is coupled in communication with the check valve that is normally open to receive vacuum, but that will close if the vacuum pressure on the input side of the check valve rises above that on the output side of the check valve. The check valve is coupled in communication via a line to the vacuum tank that stores a vacuum supply for the trailer brake system. The opposite side of the vacuum tank is coupled in communication with the relay valve. The relay valve is also coupled via a line to communicate with the air filter. The relay valve thus receives a supply of service vacuum and a supply of air at atmospheric pressure. The booster has an internal diaphragm (not shown) that divides the booster into two compartments. The relay valve is coupled in communication with the first compartment of the booster, that is closer to the rear of the trailer, to couple the service vacuum via the vacuum tank to the first compartment. The relay valve is also coupled to communicate with the booster's second compartment. The relay valve is structured and functions so that, if the vacuum control signal on the line 15 rises in vacuum pressure level due to the driver's application of the brakes, the relay valve couples the line terminated by the air filter 21 into communication with the booster's second compartment, to allow air from atmosphere into the air filter, through the relay valve and into the booster's second compartment, in an amount proportional to the pressure level of the vacuum control signal. The entrance of air into the second compartment creates a pressure differential across the diaphragm to which the piston is attached. The diaphragm deflects toward the trailer's rear, driving the piston into the cylinder 22. Hydraulic fluid contained by the piston and cylinder is driven in the lines 23 to activate the trailer's brakes 24. On the other hand, if the vacuum control signal drops in vacuum pressure level due to the driver's release of the brakes, the relay valve decouples air from the filter 21 from the second compartment of the booster 20, so that the vacuum control signal is coupled through the relay valve to restore vacuum in the second compartment. The booster's diaphragm thus relaxes toward its unflexed, neutral position and withdraws the piston from the cylinder 22 to allow hydraulic fluid to return to the cylinder, thus releasing the trailer's brakes.

3. The Tow Vehicle/Brake System Interface

The invented apparatus can include a control valve 30 that generally serves to coordinate the braking action of the tow vehicle and trailer brake systems. The control valve is coupled in communication with one of the rear brake line connections to the master cylinder 12. More specifically, the control valve is coupled to communicate with one end of a line 31, that has a second, opposite end communicatively coupled to a first leg of a T-conduit 32. The T-conduit has a second leg coupled in communication with the master cylinder's rear brake line, and has a third leg coupled to communicate with the master cylinder's rear brake output. The control valve is also coupled to communicate with vacuum control and service lines 33, 34. The lines 33, 34 are coupled to respective quick-release connectors 35, 36 to which respective lines 15, 16 are normally coupled in communication, but which can be disconnected to allow separation of the tow vehicle and trailer. The control valve also receives air from atmosphere and a vacuum supply generated by elements of the invented apparatus yet to be described in detail.

The operation of the control valve in interfacing the tow vehicle brake system with the trailer brake system is as follows. If the driver activates the tow vehicle's brakes, the resulting hydraulic brake signal from the master cylinder travels through its connection to and through the T-conduit, through the line 31 and into the control valve 30. The control valve 30 allows a proportional amount of air into the vacuum control line 33, based on the hydraulic signal, that causes the trailer brakes to be activated proportionally to the degree to which the driver applies the brakes. On the other hand, if the driver releases the tow vehicle's brakes, the back pressure of the hydraulic fluid causes it to flow back to a degree from the control valve through the line 31, T-conduit 32 and back toward the master cylinder 12. The control valve is coupled to communicate its vacuum supply at a substantially constant pressure level to the vacuum service line 34 to operate the trailer brake system.

4. The Invented Apparatus

The invented apparatus generally includes a vacuum sensor 38, a controller 39, and a vacuum pump 40. The vacuum sensor is coupled to communicate with the vacuum supply required to generate at least the vacuum supply signal, and preferably also the vacuum control signal since it is derived in part from the vacuum supply signal. In the preferred configuration, the vacuum sensor is coupled to the control valve located in the engine compartment of the tow vehicle. The vacuum sensor is coupled to sense the pressure of the vacuum supply communicating with the control valve's interior chamber, that is used by the control valve to generate the vacuum control signal and the service vacuum required to operate the trailer brake system. Based on the sensed vacuum pressure level, the vacuum sensor generates an electric signal indicative of the vacuum supply pressure, referred to herein as the 'vacuum pressure level signal'. The vacuum sensor is coupled to supply the electric signal to the controller.

The controller preferably includes a microcontroller, and receives electric power from the tow vehicle's electrical system. The controller is preferably positioned underneath the dashboard inside the driver's compartment of the tow vehicle. The controller is programmed to periodically read the vacuum pressure level signal generated by the vacuum sensor. The controller compares the vacuum pressure level signal with a first predetermined pressure level that is preprogrammed into the controller, and generates a vacuum pump control signal with an activated state if the sensed vacuum pressure is less than or equal to the first predetermined level. The first predetermined level is preferably determined to be safely below the maximum vacuum pressure at which proper generation of the vacuum control signal and also the service vacuum supply, can be ensured. On the other hand, if the controller determines that the vacuum supply pressure is greater than the first predetermined level, the controller does not affect the former state of the vacuum pump switch signal with a deactivated state. The controller also periodically reads the vacuum pressure level from the sensor, and compares the sensed vacuum pressure with a second predetermined level. If the sensed vacuum pressure is greater than or equal to the second predetermined level, the controller deactivates the vacuum pump. On the other hand, if the sensed vacuum pressure is less than the second predetermined level, the controller does not affect the previous state of the vacuum pump switch signal. The controller is coupled to supply the vacuum pump switch signal to the vacuum pump. In its activated state, the switch signal causes the vacuum pump to generate vacuum for the supply used to generate the vacuum control signal and also the vacuum service supply. On the other hand, in its deactivated state, the switch signal causes the vacuum pump to deactivate to stop producing vacuum for the supply.

To summarize the functions performed by the controller, if the controller determines that the sensed vacuum pressure level has fallen to or below the first predetermined pressure level, the controller generates a vacuum pump switch signal to place the pump in its activated state to generate vacuum for the supply. If the vacuum pump is activated by the controller, the controller periodically determines whether the vacuum supply pressure has risen sufficiently so that the vacuum pump can be deactivated. The pump thus builds the vacuum supply back up again until the vacuum pressure level reaches the second predetermined level, at which level the controller deactivates the pump by deactivating the vacuum pump switch signal. The controller thus functions to maintain the vacuum supply between the first and second predetermined levels to ensure adequate vacuum to operate the trailer brake system.

The controller is coupled to output the electric vacuum pump switch signal to a relay 41 that is coupled to the vacuum pump. The vacuum pump and its coupled relay are preferably, although not necessarily, positioned and mounted inside the tow vehicle's engine compartment. The relay is electrically-activated and controls the vacuum pump to generate vacuum, based on the state of the vacuum pump switch signal generated by the controller. If the controller deactivates the vacuum pump switch signal, the relay is deactivated and hence the vacuum pump generates no vacuum supply. If activated by the controller, the vacuum pump switch signal assumes a state that activates the relay to activate the vacuum pump. The vacuum pump has sufficient pump capacity to completely evacuate the brake system(s) from an atmospheric condition within about one or two minutes or less. The vacuum pump is coupled in an air-tight manner to the vacuum supply used to operate the trailer brake system. In the embodiment of FIG.1, the apparatus includes a conduit 42 communicatively coupled between the vacuum pump and the control valve.

If the tow vehicle's engine is a diesel type, the vacuum pump is the only source of vacuum available to operate the trailer's brakes. However, if the tow vehicle's engine is an electronic fuel injection (EFI) or conventional gas-powered type, the tow vehicle will typically have a vacuum source that is insufficient to operate the trailer's brakes. The vacuum generated by such engines can be used to advantage by coupling such vacuum source to that generated by the vacuum pump. The vacuum supply generated by the engine's source and the vacuum pump can be coupled together with an additional conduit 43 that is coupled to communicate with the conduit 42 and the engine's air intake manifold in FIG.1. As another alternative configuration, the conduit 42 can be coupled in communication with the booster 9 to provide vacuum for its second compartment to assist the driver in applying the brakes. This alternative configuration can be used with or without coupling the vacuum supply from the vacuum pump to the engine's vacuum source (if any exists).

The invented apparatus can also include a display 44 coupled to the controller 39. Preferably, the display is located on the tow vehicle's dashboard in a position readily visible to the driver. The controller periodically reads the vacuum pressure level signal from the vacuum sensor 38, and generates a display signal indicative of the vacuum pressure level, based on the vacuum sensor's signal. The controller is coupled to supply the display signal to the display, to generate a visual indication to the driver of the amount of vacuum present in the supply for use in operating the trailer's brake system. The display can be a light-emitting diode (LED) display or liquid crystal display (LCD) preferably back-lit for night-driving.

The invented apparatus can also include an alarm 45 coupled to the controller 39. The alarm 45 is preferably situated inside the driver's compartment of the tow vehicle in proximity to the driver. The controller periodically reads the vacuum pressure level signal generated by the vacuum sensor 38. The controller compares the sensed vacuum pressure level with a predetermined alarm level that is preprogrammed into the controller. The alarm level corresponds to a vacuum pressure level below which the vacuum supply can no longer be guaranteed to generate sufficient vacuum to operate the trailer brake system if the driver applies the tow vehicle's brake system. If the vacuum pressure level is below the alarm level, the controller generates an alarm signal with an activated state. The controller is coupled to supply the alarm signal in its activated state to the alarm. Based on the activated alarm signal, the alarm generates an audio and/or visual alarm to alert the driver that the vacuum supply pressure may be insufficient to operate the trailer brake system so that the driver can avoid a situation in which the driver would be forced to attempt to brake the tow vehicle and trailer combination without properly operating trailer brakes. On the other hand, if the controller determines that the vacuum pressure level is greater than or equal to the alarm level, the controller deactivates the alarm signal to deactivate the alarm.

The invented apparatus can also include a power switch 46 coupled to the controller. The power switch is preferably mounted under the tow vehicle's dashboard in a location easily accessible by the driver. The power switch is operated by hand and has two states, one state that couples the tow vehicle's electrical system to power the controller, and a second state that decouples the tow vehicle's electrical system from the controller. The power switch allows the driver to activate the controller for use while towing the trailer, and to deactivate the controller when not towing the trailer.

In FIG. 1, the tow vehicle includes a hand brake 47 coupled by a cable or the like to the control valve, that allows the driver to set the control valve so that the trailer brake system can be applied independently of the vehicle brake system.

Figure 2:
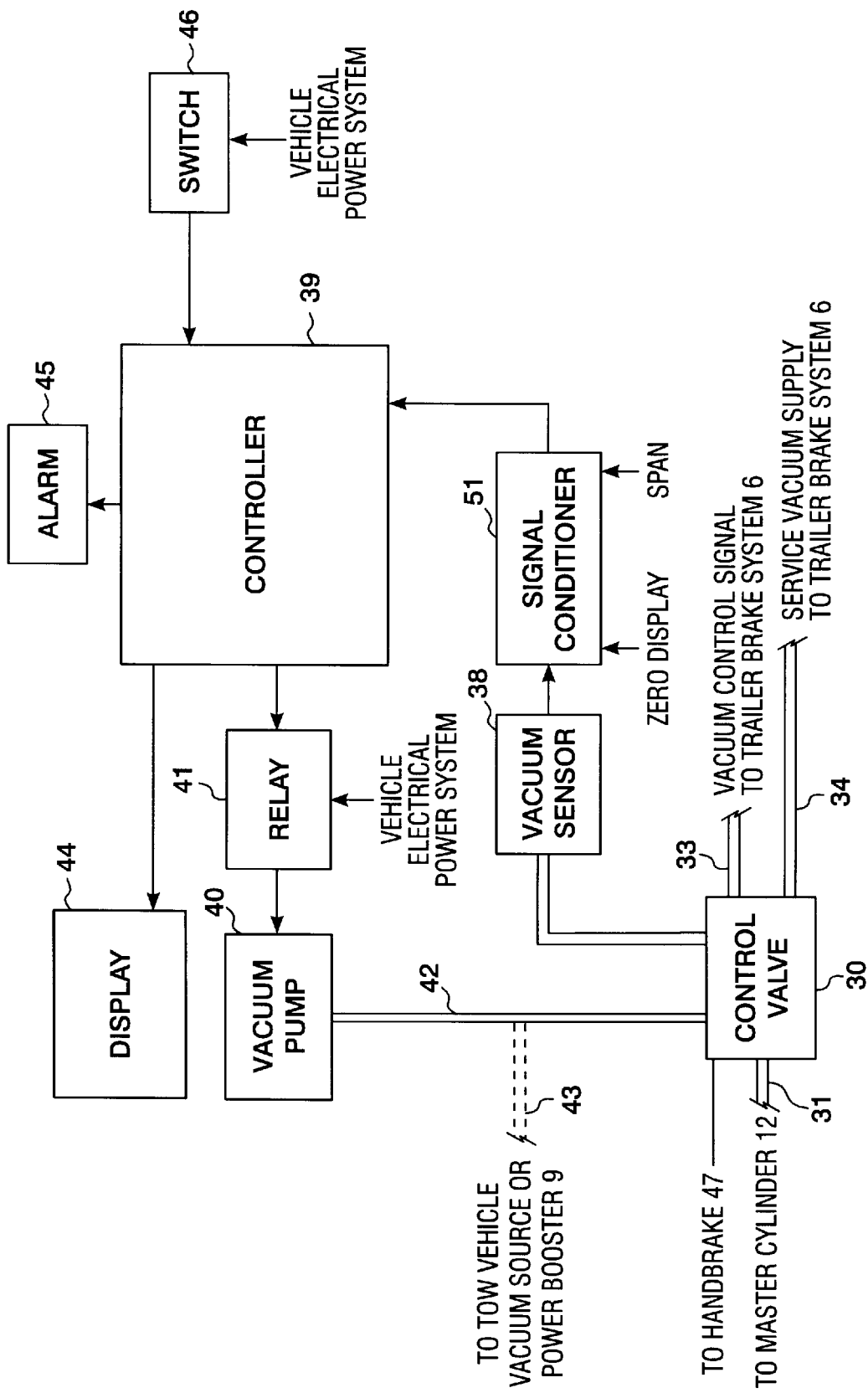
FIG. 2 is a block diagram of the invented apparatus.

FIG. 2 is a block diagram of the invented apparatus. As described with respect to FIG. 1, the apparatus generally includes the controller 39, but can also include the vacuum sensor 38, the vacuum pump 40, and the control valve 30. In addition, the invented apparatus can include the relay 41, the conduits 42, 43, the display 44, the alarm 45, the power switch 46, and a signal conditioner 51 (not shown for simplification in FIG. 1). The control valve is communicatively coupled to the master cylinder 12 and the vacuum pump 40, and is coupled to the hand brake cable. The control valve is also communicatively coupled to the vacuum control line 33 and the vacuum service supply line 34 that are operatively coupled in communication with the trailer brake system. The vacuum sensor 38 is communicatively coupled, preferably to the control valve, to sense the vacuum supply available to the control valve to generate the vacuum supply signal and, in the preferred embodiment, also the vacuum control signal, required to operate the trailer's brake system. The vacuum sensor generates an electric signal based on the sensed vacuum pressure. The vacuum sensor is coupled to supply the vacuum pressure level signal to the signal conditioner 51, The signal conditioner receives a zero display signal that sets the threshold vacuum pressure level at or above which no vacuum supply is deemed to exist for generation of the vacuum control signal and vacuum service supply required for operation of the trailer brake system. The zero display signal is externally set and is so called because it corresponds to the lowest level of the vacuum pressure that can be indicated on the display by the controller. The span signal sets the range between the zero vacuum pressure level designated by the zero display signal, and the maximum vacuum pressure level that can be indicated on the display by the controller. Thus, if the vacuum pressure level signal is at or below the zero display signal, the signal conditioner generates an output indicative of a zero vacuum level. On the other hand, if the vacuum pressure level signal is at or above the maximum vacuum level determined by the zero display signal and the span signal, the signal conditioner outputs a conditioned signal indicative of the maximum vacuum level. If the vacuum pressure level signal is between the zero and maximum vacuum pressure levels, the signal conditioner generates and outputs the conditioned signal with a level proportional to the level of the vacuum pressure level signal.

The controller 39 is coupled to receive the conditioned signal from the conditioner 51. The controller periodically reads the conditioned signal and compares the level of the conditioned signal with a first predetermined pressure level stored in the controller. If the level of the conditioned signal is less than or equal to the first predetermined level, the controller generates the vacuum pump switch signal with an activated state. The controller is coupled to supply the vacuum pump switch signal to the relay 41. The relay is coupled to the vacuum pump, and activates the vacuum pump, based on the activated vacuum pump switch signal. On the other hand, if the level of the conditioned signal is above the first predetermined level, the controller does not affect the previous state of the vacuum pump switch signal.

If the controller activates the vacuum pump switch signal, the controller periodically reads the conditioned signal and determines whether the level of the conditioned signal is at or above a second predetermined level that is stored in the controller. The second predetermined level corresponds to a vacuum pressure that is sufficiently high to ensure that the vacuum supply will be adequate to operate the trailer's brakes. Thus, as the vacuum supply pressure rises due to the operation of the vacuum pump, the level of the conditioned signal eventually rises to or above the second predetermined pressure level. If the controller determines that the conditioned signal's level is at or above the second predetermined pressure level, the controller generates the vacuum pump switch signal in a deactivated state. Based on the deactivation of the vacuum pump switch signal by the controller, the relay switches the vacuum pump into a deactivated state in which it generates no further vacuum for the supply.

The controller is also coupled to the display 44. The controller generates the display signal supplied to the display, based on the level of the conditioned signal. The display preferably includes a two-digit LED or back-lit LCD display in which a low numerical value indicates that the vacuum supply is relatively low, and a relatively high numerical value indicates that the vacuum supply is relatively plentiful. In addition, the controller compares the level of the conditioned signal with a predetermined alarm level stored in the controller. If the conditioned signal has a level at or below the predetermined alarm level, the controller generates the alarm signal with an activated state. The controller is coupled to the alarm 45 that generates an audio or visual indication to the driver, based on the alarm signal, to indicate to the driver that the vacuum supply may be insufficient to operate the trailer brake system. On the other hand, if the conditioned signal is above the predetermined alarm level, the controller generates the alarm signal with a deactivated state so that the alarm generates no audio or visual indication of an alarm condition.

The controller is coupled to the power switch 46. The power switch is coupled to the tow vehicle's electrical system. In its preferred configuration, the power switch can be manipulated by the driver to an 'on' position to couple the tow vehicle's electrical power system to the controller for operation, or alternatively, can be manipulated to an 'off' position to decouple the tow vehicle's electrical power system from the controller, to deactivate the controller. The controller is thus selectively powered by the power switch.

The vacuum pump is communicatively coupled, preferably through the conduit 42, to supply the vacuum generated by the pump to the control valve 30. The conduit 42 can be coupled to communicate with a vacuum source, if any, generated by the tow vehicle's engine via a conduit 43, so that the vacuum source generated by the engine can be used together with the pump to generate the vacuum supply required for operation of the trailer brake system. The conduit 42 can be used to communicatively couple the vacuum supply generated by the vacuum pump to the power booster 9 for the tow vehicle's brake system, in addition to or as an alternative for coupling the conduit 43 with any vacuum source generated by the engine.

In operation, the controller 39 is powered by the driver through manipulation of the switch 46. Upon activation, the controller periodically reads the conditioned signal generated by the signal conditioner based on the vacuum pressure level signal from the vacuum sensor. The controller activates, or alternatively deactivates, the vacuum pump via the relay, based upon the conditioned signal, and the first and second predetermined pressure levels stored in the controller's memory. In addition, the controller generates the display signal for the display, based on the conditioned signal, to indicate to the driver the vacuum supply level available for operation of the trailer brake system. The controller also compares the conditioned signal's level to the predetermined alarm level stored in the controller's memory, and activates the alarm signal if the conditioned signal's level is at or below the predetermined alarm level, and deactivates the alarm signal if the alarm level is above the alarm level. The controller outputs the alarm signal to the alarm that generates an audio or visual indication to the driver to warn of a low vacuum supply if the controller activates the alarm signal, and that deactivates the alarm signal otherwise. The vacuum pump generates vacuum as the controller determines necessary, and is coupled to supply this vacuum to the control valve. If the driver depresses the brake pedal to stop the tow vehicle and trailer, the control valve senses the activation of the tow vehicle's brakes from increased pressure exerted by the brake fluid signal from the master cylinder 12. The control valve thus drops the vacuum level of the vacuum control signal by bleeding air into the vacuum control signal line 33 in an amount proportional to the degree to which the driver applies the tow vehicle's brakes, to proportionally activate the trailer brake system. On the other hand, if the driver releases the tow vehicle brake pedal, the control valve shuts off the bleed air supply from atmosphere and couples the vacuum supply generated by the vacuum pump to the vacuum control line to evacuate the line 33, causing the trailer brake system to release its brakes. In the preferred configuration, the control valve couples the vacuum supply generated by the vacuum pump, as a constant supply of service vacuum to the trailer brake system.

Figure 3:
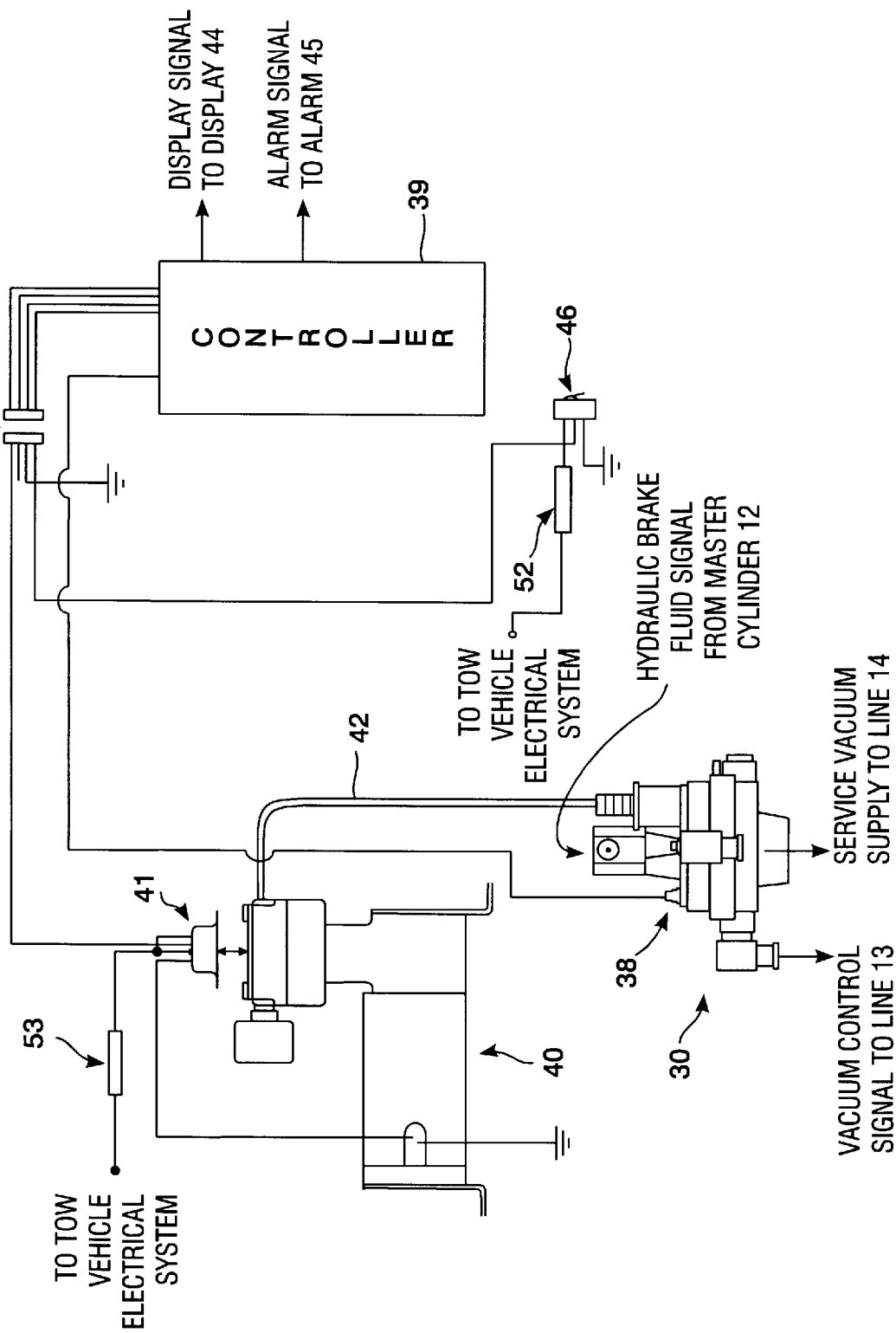
FIG. 3 is a view of various elements of the invented apparatus.

FIG. 3 is an exemplary configuration for the invented apparatus. The elements of the invented apparatus have been previously described with reference to FIGS. 1 and 2, so a detailed description of these elements is omitted with respect to FIG. 3 as redundant. The configuration of FIG. 3 warrants some description, however, with respect to items formerly not described. Preferably, the power switch is coupled to the tow vehicle's electrical system through a fuse 52 to prevent damage to the tow vehicle electrical system due to an unlikely failure of the switch or controller. In addition, the relay 41 is coupled to the tow vehicle's electrical system via a fuse 53 to prevent damage to the tow vehicle electrical system due to an unlikely failure in the pump. To distinguish the relay from the vacuum pump 40, the relay is shown separated from the vacuum pump. In actuality, the relay is mounted to the vacuum pump but can also be remotely mounted to selectively supply electric power from the tow vehicle's electrical system, based on the state of the vacuum pump switch signal. If powered by the relay, the vacuum pump generates vacuum for the supply required to operate the trailer brake system. In FIG. 3, the controller is coupled to the relay, the power switch and ground (i.e., the tow vehicle's chassis) by joining together the connector 54. Although the configuration of the elements of FIG. 3 is believed novel, the control valve, power switch, vacuum pump, relay, connector and fuses, considered individually, are commercially-available items. The controller is described in detail below with reference to FIGS. 4, 5 and 6.

Figure 4:
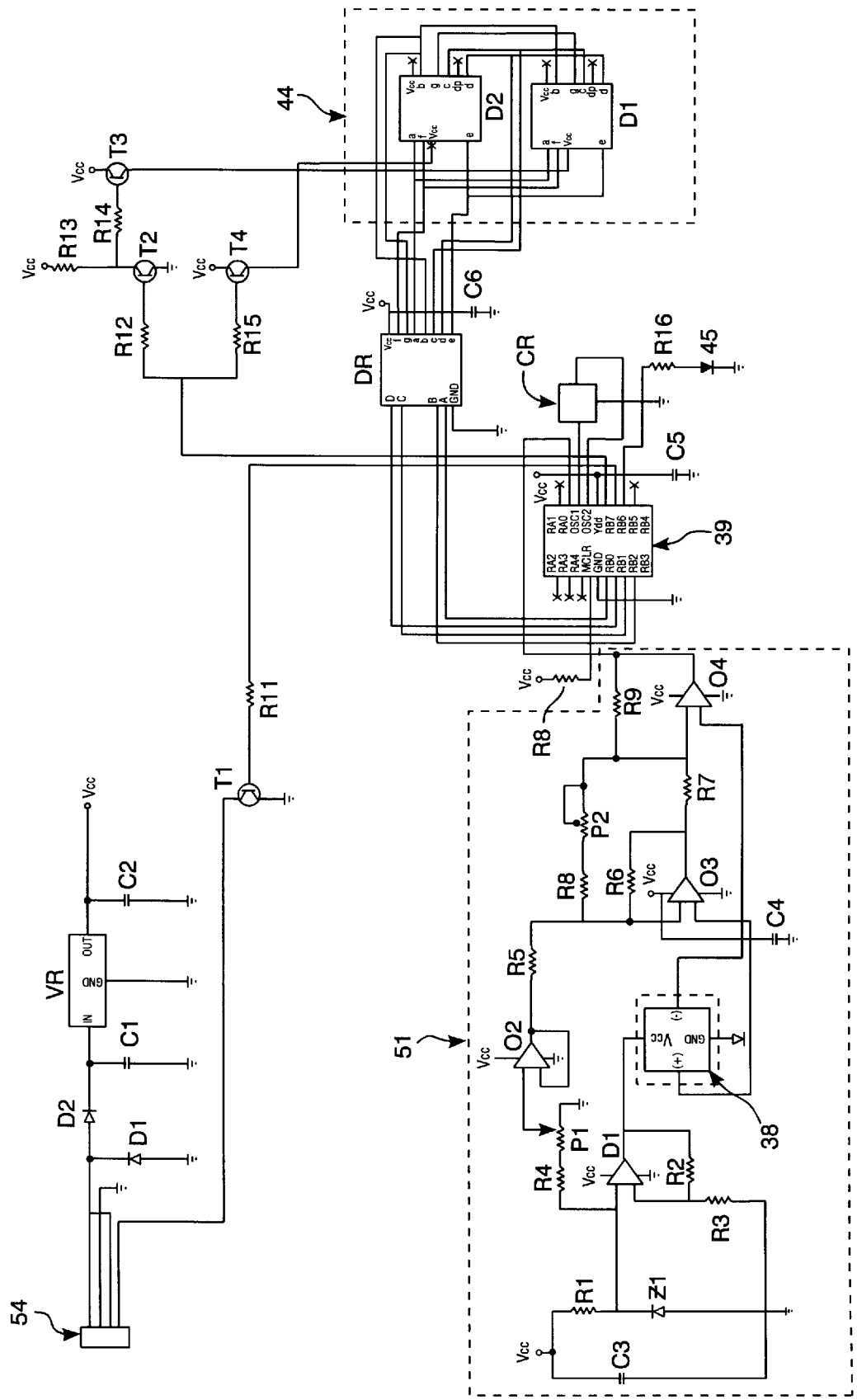
FIG. 4 is a circuit diagram of various elements of the invented apparatus.

In FIG. 4, the connector 54 is coupled to the tow vehicle's electrical system that supplies power to the cathode of diode D1 whose anode is coupled to ground, and the anode of diode D2 whose cathode is coupled to the input terminal of voltage regulator VR and a terminal of capacitor C1 whose opposite terminal is coupled to ground. A terminal of the voltage regulator is coupled to ground, and its output terminal is coupled to a terminal of the capacitor C2 whose opposite terminal is coupled to ground. The output terminal of the voltage regulator VR generates a voltage $V_{cc}$ that is used by several elements of the circuit of FIG. 4.

The signal conditioner 51 includes resistors R1–R9, capacitors C3–C4, potentiometers P1–P2, operational amplifiers O1–O4, and zener diode Z1. The voltage $V_{cc}$ is coupled to a terminal of capacitor C3 whose opposite terminal is coupled to ground. The voltage $V_{cc}$ is also coupled to a terminal of the resistor R1 whose opposite terminal is coupled to the cathode of zener diode Z1 whose anode is coupled to ground. A non-inverting terminal of operational amplifier O1 is coupled to the cathode of the zener diode Z1. The resistor R2 is coupled between the inverting and output terminals of the operational amplifier O1, and a resistor R3 is coupled between the inverting terminal of the operational amplifier O1 and ground. The output of the operational amplifier O1 is coupled to a terminal of the vacuum sensor 38 that has another terminal coupled to ground.

The non-inverting terminal of the operational amplifier O1 is coupled to a terminal of the resistor R4 whose opposite end is coupled to a terminal of the potentiometer P1. The potentiometer P1 has an opposite terminal coupled to ground. The potentiometer P1 is an adjustment that can be controlled by hand, and generates the display zero signal supplied to the non-inverting terminal of the operational amplifier O2. The output of the operational amplifier O2 which is the display zero signal, is coupled to its inverting terminal and to a terminal of the resistor R5 whose opposite terminal is coupled to the inverting terminal of the operational amplifier O3. The operational amplifier O3 has a non-inverting terminal coupled to the positive differential sensor output from the vacuum sensor 38. The operational amplifier O3 also has a capacitor C4 coupled between its power terminal and ground. A resistor R6 is coupled between the output and inverting terminals of the operational amplifier O3. The resistor R7 is coupled from the output of the operational amplifier O3 to the inverting terminal of the operational amplifier O4. A resistor R8 is coupled between the inverting terminal of the operational amplifier O3 and a terminal of the potentiometer P2 whose opposite terminal is coupled to the inverting terminal of the operational amplifier O4. The potentiometer P2 is an adjustment that sets the span range between the zero and maximum level of the conditioned signal generated at the output of the operational amplifier O4. The negative differential sensor output from the vacuum sensor 38 is coupled to the non-inverting terminal of the operational amplifier O4.

The controller 39 is preferably a model no. P1C16C71-20-IP commercially available from Microchip Technology, Inc. The controller 39 is coupled to receive the conditioned signal from the output terminal of the operational amplifier O4 of the signal conditioner 51, at its RA0 terminal. The other controller inputs RA1–RA4 are left floating (i.e., are not connected) and the controller's voltage terminal $V_{dd}$ is coupled to the voltage supply $V_{cc}$. A capacitor C5 is coupled between the voltage terminal $V_{cc}$ and ground, and the controller's GND terminal is coupled to ground. The controller's terminals OSC1, OSC2 are coupled to respective terminals of a resonator CR that has a third terminal that is grounded. The controller's terminal MCLR is coupled to $V_{cc}$ through a resistor R10. The controller outputs RB0–RB3, are coupled to respective inputs A–D of binary-coded decimal (BCD) driver DR (such as the model no. CA3161E commercially available from Harris Semiconductor Corporation). The controller terminal RB4 is left floating. The controller output RB6 generates the vacuum pump switch signal, and is coupled to a terminal of resistor R11 whose opposite terminal is coupled to the base of NPN transistor T1. The emitter of transistor T1 is coupled to ground, and its collector is coupled to connector 54 that, if coupled to its second half, couples the collector of transistor T1 to the relay 41 to activate or deactivate the vacuum pump according to the state of the vacuum pump switch signal.

The BCD driver has a terminal VCC coupled to the voltage supply $V_{cc}$, and a ground terminal GND coupled to ground. A capacitor C6 is coupled between the BCD driver's terminal VCC and ground. The BCD driver's outputs a-f are coupled to respective inputs of the seven-segment LED or back-lit LCD displays D1, D2 (such as model no. LN514RA available from Panasonic, Inc.) of the display 44. The displays D1, D2 have respective dp and one of two $V_{cc}$ terminals, that are left floating. The controller's RB7 output signal periodically toggles between high- and low-logic states, and the controller outputs the first digit to be displayed on the display D1 at the high-logic state of the RB7 output signal, and the second digit to be displayed on the display D2 on the low-logic state of the RB7 output signal. The controller's RB7 output signal is coupled to a terminal of resistor R12 whose opposite terminal is coupled to a base of NPN transistor T2. The collector of the transistor T2 is coupled to a terminal of the resistor R13 whose opposite terminal is coupled to the voltage supply $V_{cc}$. The collector of the transistor T2 is also coupled to a terminal of resistor R14 whose opposite terminal is coupled to the base of PNP transistor T3. The emitter of transistor T3 is coupled to the voltage supply $V_{cc}$. The collector of transistor T3 is coupled to a terminal $V_{cc}$ of the display D1. The RB7 output signal is also coupled to a terminal of resistor R15 whose opposite terminal is coupled to the base of PNP transistor T4. The emitter of the transistor T4 is coupled to the voltage supply $V_{cc}$, and its collector is coupled to the terminal $V_{cc}$ of the display D2.

If the controller's output signal RB7 is in a high-logic state, the transistor T2 conducts, lowering the voltage at the base of transistor T3 to render the transistor T3 conductive. The conductive state of the transistor T3 supplies power to the display D1 that receives and displays the first digit of the display signal output by the controller. If the controller's output signal RB7 is in a high-logic state, the transistor T4 is non-conductive so that no power is supplied to the display D2 so that it is deactivated. On the other hand, if the controller's output signal RB7 is in a low-logic state, the transistor T2 is rendered non-conductive, causing the voltage at the base of the transistor T3 to be in a high-logic state that renders the transistor T3 non-conductive, thus deactivating the display D1. However, with the controller's RB7 output signal in a low-logic state, the transistor T4 conducts so that power is supplied to the display D2 as the controller outputs the second digit of the display signal on output terminals RB0–RB3. The display D2 is thus powered and displays the second digit of the display signal. The controller continuously alternates the power and display of the first and second digits of the display signal on the displays D1, D2 according to the high- or low-logic state of the controller's RB7 output signal. By alternating the display of the digits in this manner at a sufficiently fast rate, the number of bits, and hence the cost, of the controller can be reduced without any flicker of the displays D1, D2 that is visible to the human eye. The displays D1 and D2 are located in a position so that they are visible to the tow vehicle's driver.

The RB5 output terminal of the controller is coupled to a terminal of the resistor R16 whose opposite terminal is coupled to a light-emitting diode that serves as the alarm 45. By activating the RB5 output terminal, the controller generates an indication of a dangerous low-vacuum supply condition to the tow vehicle driver. Conversely, if the RB5 output terminal is deactivated, the light-emitting diode of the alarm 45 is extinguished to indicate that no low-vacuum supply alarm condition exists.

Figure 5:
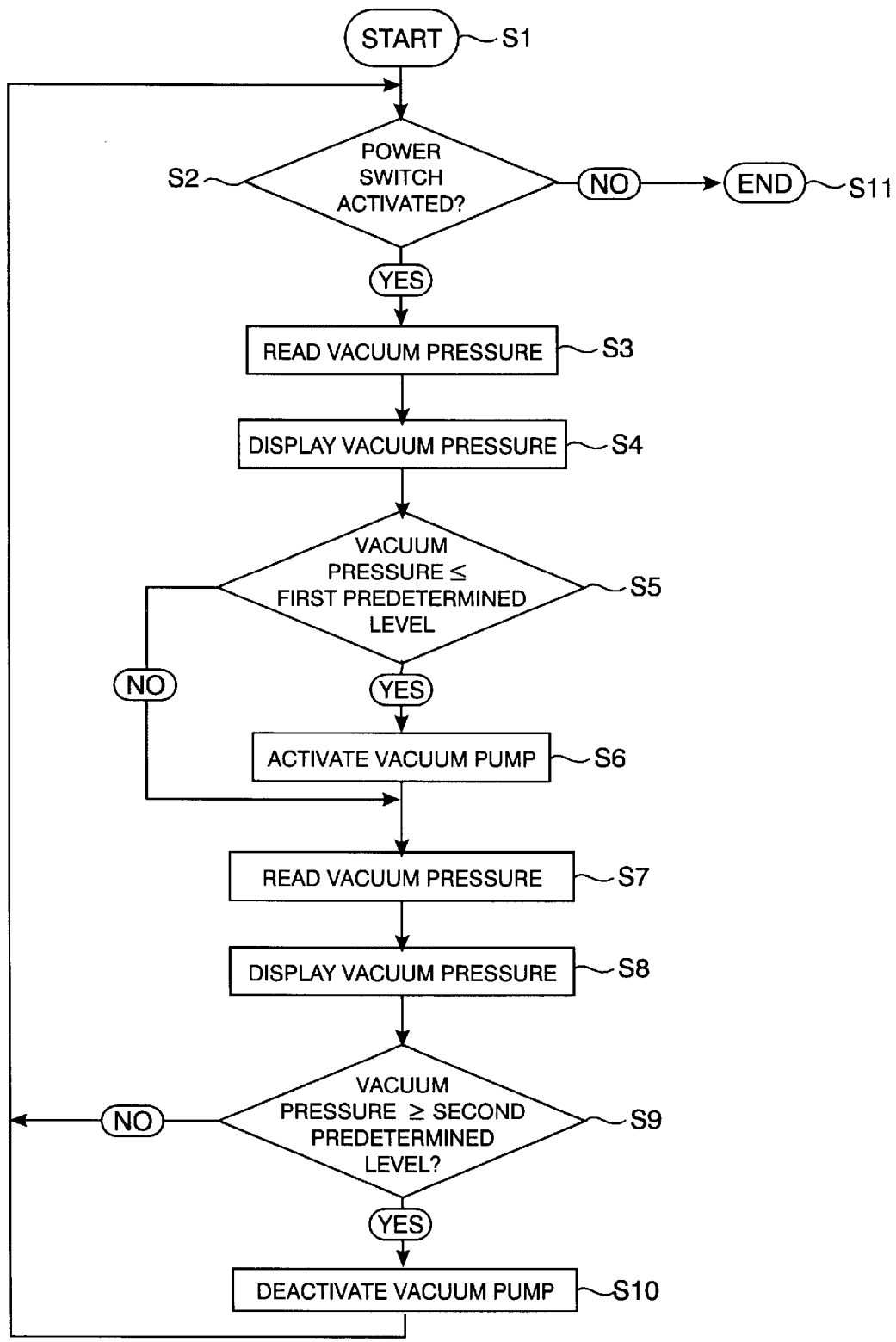
FIG. 5 is a flow chart of processing performed by a controller of the invented apparatus to ensure a sufficient vacuum supply to operate the trailer's brake system.

In preferred operation of the embodiment of FIG. 4, a person controls the display zero by adjustment of the potentiometer P1 of the signal conditioner 51 to set the vacuum pressure level at or below which the controller will generate the display signal to indicate that no vacuum supply exists to operate the trailer brake system. The manufacturer also sets the display span by adjustment of the potentiometer P2 of the signal conditioner 51 to indicate the desired range of vacuum pressure levels that can be processed by the controller. FIG. 5 is a flowchart of processing performed by the controller to ensure an adequate vacuum supply for operation of the trailer's brake system. The processing of FIG. 5 is programmed into the controller's memory. In step S1, the processing performed by the controller begins. In step S2, the controller determines whether the power switch is activated. In actuality, the controller cannot function unless the power switch has been activated, but step S2 indicates that the controller continuously performs monitoring and replenishment of the vacuum supply for the trailer brake system, as long as power is supplied to the controller. In step S3, the controller reads the vacuum pressure generated by the signal conditioner based on the vacuum pressure level signal generated by the vacuum sensor 38, and the display zero and span signals set externally by the manufacturer. In step S4, the controller generates a display signal based on the conditioned signal. More specifically, the controller generates a two-digit digital signal for display on the display 44. The controller generates the toggle signal on its RB7 output terminal. If the toggle signal has a high-logic state, the controller outputs the display signal with the digit for the display D1 to the BCD driver DR that generates the seven-segment display on the display D1. On the other hand, if the toggle signal has a low-logic state, the controller outputs the display signal with the digit for the display D2 to the BCD driver DR that generates the seven-segment display for the display D2. The controller continues to display the latest vacuum pressure level reading until a subsequent reading is taken by the controller.

In step S5, the controller determines whether the vacuum pressure level indicated by the conditioned signal, is less than the first predetermined level preprogrammed into the controller's memory. For example, the first predetermined level could be about −17 inches of mercury for many particular applications of the invented apparatus. If the determination in step S5 is negative, control proceeds to step S7. On the other hand, if the vacuum pressure level indicated by the conditioned signal is less than or equal to the first predetermined level, in step S6, the controller activates the vacuum pump switch signal on the output terminal RB6 that renders transistor T1 conductive and hence that activates the relay 41 coupled to connector 54. The relay activates the vacuum pump to generate vacuum for the supply used to operate the trailer's brake system. In the preferred configuration, the vacuum pump generates vacuum on the conduit 42 that is supplied to the control valve 30, and optionally, is communicatively coupled to the tow vehicle vacuum source or the power booster 9 via conduit 43. In step S7, the controller reads the conditioned signal on its input terminal RA0, and in step S8, generates the display signal based on the vacuum pressure level indicated by the conditioned signal, in a manner similar to steps S3 and S4. In step S9, the controller determines whether the vacuum pressure level indicated by the conditioned signal is greater than or equal to the second predetermined vacuum pressure level, for example, of about −23 inches of mercury. The second predetermined vacuum pressure level is preferably preprogrammed into the controller's memory. If the vacuum pressure level is greater than or equal to the second predetermined pressure level, in step S10 the controller deactivates the vacuum pump switch signal generated at output terminal RB6. The deactivated state of the vacuum pump switch signal renders the transistor Ti non-conductive, and likewise deactivates the relay so that the vacuum pump generates no further vacuum supply. After performance of step S10, control returns to step S2. On the other hand, in step S9, if the vacuum pressure level is less than the second predetermined level, control proceeds to step S2. Preferably, the controller performs each step in a fraction of a second so that vacuum can be quickly restored to operate the trailer brake system should it become depleted through normal use of the tow vehicle and trailer brake systems. The controller continues to perform steps S2 through S10 until the power switch is deactivated in step S2 to end the controller's processing in step S11.

Figure 6:
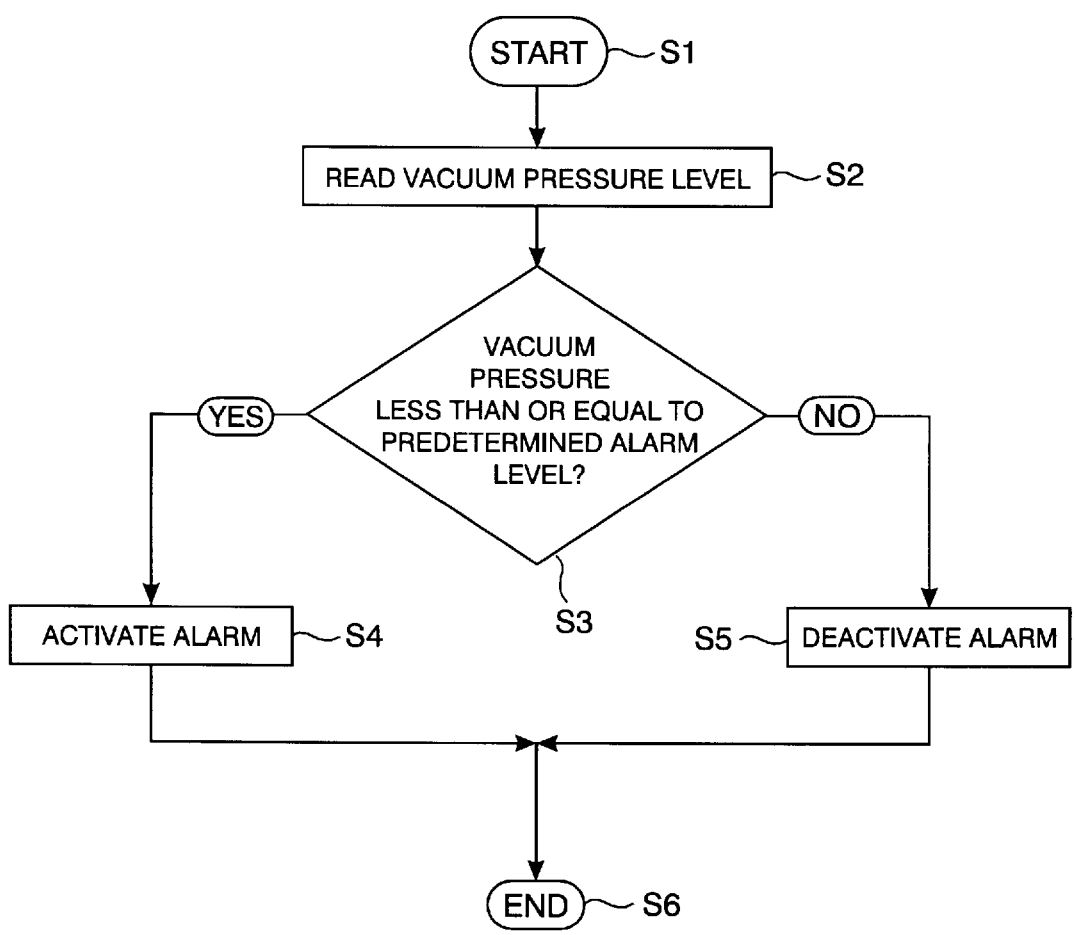
FIG. 6 is a flow chart of processing performed by the controller to generate an alarm to warn of a low-vacuum condition in the trailer brake system.

FIG. 6 is a flow chart of processing performed by the controller to determine whether the vacuum pressure level is adequate to operate the trailer brake system, and, if not, to warn the driver of the potentially dangerous low-vacuum condition. In step S1, the processing of FIG. 6 starts. In step S2, the controller reads the conditioned signal to determine the vacuum pressure level in a manner similar to steps S3 or S7 of FIG. 5. If the vacuum pressure level is less than or equal to the predetermined alarm level stored in the controller's memory, the controller activates the alarm signal on its RB5 output terminal to activate the alarm 45. The alarm can be a visual indication such as the LED of FIG. 4 or can be an audio alarm. On the other hand, in step S3, if the vacuum pressure level is greater than the predetermined alarm level, the controller generates the alarm signal on its RB5 terminal so as to deactivate the alarm 45 in step S5. After performing one of steps S4 and S5, the processing of FIG. 6 terminates in step S6. Preferably, the steps of the processing of FIGS. 5 and 6 are alternated through the use of standard interrupts, for example, so that the controller monitors and controls the vacuum supply, and also generates the alarm, if necessary, within a reasonably short period of time, preferably less than one second.

Although the tow vehicle shown in FIG. 1 is a utility truck and the trailer has a particular configuration, the tow vehicle and trailer of FIG.1 are representative only, and other types of tow vehicles and/or trailers can be used without departing from the scope of this invention. For example, the invented apparatus and method can readily by applied to vacuum-over-hydraulic tag axle brake systems in motor homes.

The many features and advantages of the present invention are apparent from the detailed specification and thus, it is intended by the appended claims to cover all such features and advantages of the described apparatuses and method which follow in the true spirit and scope of the invention. Further, since numerous modifications and changes will readily occur to those of ordinary skill in the art, it is not desired to limit the invention to the exact construction and operation illustrated and described. Accordingly, all suitable modifications and equivalents may be resorted to as falling within the spirit and scope of the invention.

I claim:

1. An apparatus for use with driver-operated brake systems of a tow vehicle and a trailer towed by the tow vehicle, the apparatus comprising:
    a vacuum sensor coupled to sense a vacuum supply of the trailer brake system used to generate a vacuum control signal based on a brake fluid control signal generated by operation of the tow vehicle brake system by the driver, the vacuum sensor generating a vacuum pressure level signal based on a pressure of the vacuum supply;
    a controller coupled to the vacuum sensor, the controller generating a vacuum pump switch signal based on the vacuum pressure level signal; and
    a vacuum pump coupled to the controller, and generating vacuum for the supply based on the vacuum pump switch signal.

2. An apparatus as claimed in claim 1, further comprising:
    a signal conditioner coupled between the vacuum sensor and the controller, generating a conditioned signal based on the vacuum pressure level signal.

3. An apparatus as claimed in claim 2 further comprising:
    a display coupled to the controller,
    the controller generating a display signal based on the conditioned signal, the controller supplying the display signal to the display to indicate the vacuum pressure level.

4. An apparatus as claimed in claim 3, wherein the signal conditioner includes an adjustment to set a display zero corresponding to the lowest vacuum pressure level that can be displayed on the display by the controller.

5. An apparatus as claimed in claim 3, wherein the signal conditioner includes an adjustment to set a span range between the display zero level and a maximum vacuum pressure level that can be displayed on the display by the controller.

6. An apparatus as claimed in claim 1, wherein the controller includes a microcontroller.

7. An apparatus as claimed in claim 1, further comprising:
    a display coupled to the controller,
    the controller generating a display signal based on the vacuum pressure level signal, the controller supplying the display signal to the display to indicate the vacuum pressure level.

8. An apparatus as claimed in claim 7, further comprising:
a binary-coded decimal driver coupled between the controller and the display, to generate the display based on the display signal from the controller.

9. An apparatus as claimed in claim 7, wherein the display includes at least two display parts displaying respective digits, the controller generating a toggle signal having first and second states that alternately activate the first and second display parts, the controller generating a first digit of the display signal during the first state of the toggle signal to generate a display on the first display part, and the controller generating a second digit of the display signal during the second state of the toggle signal to generate a display on the second display part.

10. An apparatus as claimed in claim 1, further comprising:
an alarm coupled to the controller,
the controller generating an alarm signal if the controller determines that the vacuum pressure level is below a third predetermined pressure level.

11. An apparatus for use with brake systems of a tow vehicle and a trailer towed by the tow vehicle, the tow vehicle brake system generating a brake fluid control signal based on a driver's operation of the tow vehicle brake system, the apparatus comprising:
a control valve coupled to receive the brake fluid control signal and coupled to the trailer brake system, the control valve generating a vacuum control signal to control the trailer brake system, based on the brake fluid control signal;
a vacuum sensor coupled to sense a vacuum supply used to generate the vacuum control signal, the vacuum sensor generating a vacuum pressure level signal based on a pressure of the vacuum supply;
a controller coupled to the vacuum sensor, the controller generating a vacuum pump switch signal based on the vacuum level signal; and
a vacuum pump coupled to the controller, and generating vacuum for the supply based on the vacuum pump switch signal.

12. An apparatus as claimed in claim 11, wherein the controller generates the vacuum pump switch signal so as to activate the vacuum pump to increase the vacuum supply if the controller determines that the vacuum pressure level signal is less than or equal to a first predetermined level, and wherein the controller generates the vacuum pump switch signal so as to deactivate the vacuum pump so as to stop generating vacuum for the supply if the controller determines that the vacuum pressure level signal is greater than or equal to a second predetermined level that is greater than the first predetermined level.

13. An apparatus as claimed in claim 12, wherein the controller includes a microcontroller and the first and second predetermined pressure levels are programmed into the microcontroller.

14. An apparatus as claimed in claim 11, wherein the controller includes a microcontroller.

15. An apparatus as claimed in claim 11, wherein the vacuum sensor is coupled to the control valve.

16. An apparatus as claimed in claim 11, further comprising:

a display coupled to the controller,
the controller generating a display signal based on the vacuum pressure level signal, the controller supplying the display signal to the display to indicate the vacuum pressure level.

17. An apparatus as claimed in claim 16, wherein the display is positioned in the tow vehicle in a location visible to the driver.

18. An apparatus as claimed in claim 16, further comprising:
a signal conditioner coupled between the vacuum sensor and the controller, the signal conditioner adjustable to set a zero vacuum level corresponding to a condition in which the vacuum pressure level is at atmospheric pressure so that no vacuum is present in the supply, and the signal conditioner adjustable to set a span range level between the zero vacuum level and a maximum vacuum level corresponding to a highest vacuum pressure that can be processed by the controller,
the controller generating the display signal based on the zero level and the span range level.

19. An apparatus as claimed in claim 11, further comprising:
an alarm coupled to the controller,
the controller generating an alarm signal if the controller determines that the vacuum pressure level is less than or equal to a third predetermined pressure level.

20. An apparatus as claimed in claim 19, wherein the alarm is positioned in the tow vehicle in a location in proximity to the driver.

21. An apparatus as claimed in claim 11, wherein the vacuum pump is coupled to the control valve.

22. An apparatus as claimed in claim 11, further comprising:
a relay coupled between the controller and the vacuum pump, the relay activating the vacuum pump to generate vacuum if the controller activates the vacuum pump switch signal, and the relay deactivating the vacuum pump if the controller deactivates the vacuum pump switch signal.

23. An apparatus as claimed in claim 11, wherein the control valve is coupled to supply service vacuum to the trailer brake system.

24. An apparatus as claimed in claim 11, wherein the controller is located under a dashboard of the tow vehicle.

25. An apparatus as claimed in claim 11, wherein at least the vacuum pump is located in an engine compartment of a tow vehicle.

26. A method comprising the steps of:
a) sensing a pressure level of a vacuum source;
b) comparing the sensed pressure level with a first predetermined level;
c) activating a vacuum pump to generate vacuum for the source, if the sensed pressure level is determined in said step (b) to be less than or equal to the first predetermined level;
d) comparing the sensed pressure level with a second predetermined level greater than the first predetermined level;
e) deactivating the vacuum pump if the sensed pressure level is determined in said step (d) to be greater than or equal to the second predetermined level;

f) sensing a brake fluid signal used to operate a brake system of a vehicle towing the trailer; and g) generating a vacuum control signal with the vacuum source to operate a trailer brake system, based on the brake fluid signal sensed in said step (f).

27. A method as claimed in claim 26, further comprising the step of:

h) generating a display based on the vacuum pressure level sensed in said step (a).

28. A method as claimed in claim 26, further comprising the step of:

h) determining whether the vacuum pressure level sensed in said step (a) is less than or equal to a predetermined value to generate a result; and i) generating an alarm based on the result generated in said step (h).

29. A method as claimed in claim 26, further comprising the step of:

h) supplying vacuum generated by the vacuum source to the trailer brake system for service vacuum.

* * * * *